(12) United States Patent
Yamazaki et al.

(10) Patent No.: US 9,358,969 B2
(45) Date of Patent: Jun. 7, 2016

(54) LOAD-BASED VEHICLE OPERATING CONTROL

(71) Applicant: FORD GLOBAL TECHNOLOGIES, LLC, Dearborn, MI (US)

(72) Inventors: Mark Steven Yamazaki, Canton, MI (US); Wei Liang, Farmington Hills, MI (US); Xiaoyong Wang, Novi, MI (US); Rajit Johri, Ann Arbor, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 14/076,319

(22) Filed: Nov. 11, 2013

(65) Prior Publication Data

US 2015/0134162 A1    May 14, 2015

(51) Int. Cl.
| | |
|---|---|
| *B60W 10/08* | (2006.01) |
| *B60W 30/182* | (2012.01) |
| *B60W 20/00* | (2016.01) |
| *B60K 6/387* | (2007.10) |

(Continued)

(52) U.S. Cl.
CPC ............... *B60W 10/08* (2013.01); *B60K 6/387* (2013.01); *B60K 6/547* (2013.01); *B60W 10/06* (2013.01); *B60W 10/26* (2013.01); *B60W 20/106* (2013.01); *B60W 20/1062* (2013.01); *B60W 20/13* (2016.01); *B60W 20/14* (2016.01); *B60W 20/40* (2013.01); *B60W 30/182* (2013.01); *B60W 30/18027* (2013.01); *B60W 30/18127* (2013.01); *B60K 6/48* (2013.01); *B60K 2006/4825* (2013.01); *B60W 2510/244* (2013.01); *B60W 2530/10* (2013.01); *B60W 2530/16* (2013.01); *B60W 2530/22* (2013.01); *B60W 2540/12* (2013.01); *B60W 2710/0666* (2013.01); *B60W 2710/083* (2013.01); *B60W 2710/244* (2013.01); *Y02T 10/6252* (2013.01); *Y02T 10/6286* (2013.01); *Y10S 903/906* (2013.01); *Y10S 903/947* (2013.01)

(58) Field of Classification Search
CPC ..... B60W 10/08; B60W 20/14; B60W 20/13; B60W 10/26; B60W 20/40; B60W 30/18127; B60W 30/18027; B60W 10/06; B60W 30/182; B60W 2530/16; B60K 6/547; B60K 6/387; Y02T 10/6252; Y02T 10/6286
See application file for complete search history.

(56) References Cited

U.S. PATENT DOCUMENTS

| | | |
|---|---|---|
| 6,166,517 A | 12/2000 | Wakashiro et al. |
| 7,601,095 B2 | 10/2009 | Hasegawa et al. |

(Continued)

*Primary Examiner* — Redhwan K Mawari
*Assistant Examiner* — Edward Torchinsky
(74) *Attorney, Agent, or Firm* — David B. Kelley; Brooks Kushman P.C.

(57) ABSTRACT

A hybrid vehicle includes an engine and an electric machine, both capable of propelling the vehicle. The electric machine is electrically connected to a high voltage traction battery. The state of charge of the battery can decrease if the battery is used to power the electric machine, and can increase if the electric machine supplies power to the battery via regenerative braking. Constraints are placed on the vehicle such that the battery operates within a preferred operating window, defined between minimum and maximum state of charge thresholds. At least one controller is programmed to alter the preferred operating window of the battery in response to various vehicular activities, such as when the vehicle is towing another object, or when the vehicle weighs above a certain threshold due to contents within the vehicle, for example.

18 Claims, 3 Drawing Sheets

(51) Int. Cl.
    *B60K 6/547* (2007.10)
    *B60W 10/06* (2006.01)
    *B60W 10/26* (2006.01)
    *B60W 30/18* (2012.01)
    *B60K 6/48* (2007.10)

(56) References Cited

U.S. PATENT DOCUMENTS

| | | | |
|---|---|---|---|
| 7,657,351 B2 | 2/2010 | Moran | |
| 8,249,768 B2 * | 8/2012 | Mori et al. | 701/22 |
| 8,256,548 B2 | 9/2012 | Hummel | |
| 8,560,153 B2 * | 10/2013 | Nefcy et al. | 701/22 |
| 8,731,752 B2 * | 5/2014 | Yu et al. | 701/22 |
| 8,938,327 B2 * | 1/2015 | Doering et al. | 701/22 |
| 8,965,613 B2 * | 2/2015 | Sujan et al. | 701/22 |
| 9,014,940 B2 | 4/2015 | Newman | |
| 9,020,674 B2 * | 4/2015 | Gregg et al. | 701/22 |
| 2006/0021809 A1 * | 2/2006 | Xu et al. | 180/65.2 |
| 2006/0108956 A1 | 5/2006 | Clark et al. | |
| 2007/0199745 A1 | 8/2007 | Hayashi | |
| 2008/0254941 A1 | 10/2008 | Scott et al. | |
| 2009/0250278 A1 | 10/2009 | Kawasaki et al. | |
| 2010/0138089 A1 * | 6/2010 | James | 701/22 |
| 2011/0231048 A1 | 9/2011 | Matsubara et al. | |
| 2012/0031692 A1 | 2/2012 | Koike | |
| 2012/0078478 A1 | 3/2012 | Spaulding et al. | |
| 2012/0116628 A1 | 5/2012 | Clark et al. | |
| 2013/0035839 A1 | 2/2013 | Otanez et al. | |
| 2013/0054060 A1 | 2/2013 | Dupuy | |
| 2013/0131901 A1 | 5/2013 | Yamagata et al. | |
| 2014/0163803 A1 * | 6/2014 | Kamatani | B60K 6/445 701/22 |
| 2015/0105213 A1 * | 4/2015 | Wright et al. | 477/3 |

* cited by examiner

LOAD-BASED VEHICLE OPERATING CONTROL

TECHNICAL FIELD

The present disclosure relates to controlling an engine and an electric machine in a hybrid vehicle based upon vehicle load.

BACKGROUND

Hybrid electric vehicles (HEVs) include an internal combustion engine and a motor/generator to provide propulsion to the vehicle. One method of increasing fuel economy in the HEV is to shut down the engine, leaving the motor/generator as the sole source of torque to propel the vehicle. This can occur during times of low overall torque demands, such as when the vehicle is motionless, idling, creeping, or coasting, or having a relatively low overall acceleration demand. If, for example, the vehicle is on an incline, is subject to excessive weight in the interior of the vehicle, or is towing another vehicle, the amount of torque required to meet the acceleration demands of the operator increases. If the engine is disconnected while high acceleration demands are made and while the vehicle is subject to these excessive loads, the motor/generator alone may be insufficient to meet the driver demand.

SUMMARY

According to one embodiment, a vehicle comprises an engine, an electric machine connected to a battery, and at least one controller. In response to a charge of the battery reaching a minimum state-of-charge threshold, the controller inhibits the electric machine from propelling the vehicle to prevent an undercharge of the battery. In response to a charge of the battery reaching a maximum state-of-charge threshold, the controller inhibits regenerative braking to prevent overcharge of the battery. The battery preferably operates within the confines of the minimum and maximum state-of-charge thresholds. In response to a detection of a vehicle load condition, the controller alters one or both of the minimum state-of-charge threshold and the maximum state-of-charge thresholds. This alters the confines of the minimum and maximum thresholds, changing when the battery is inhibited from propelling the vehicle and/or receiving electric energy via regenerative braking. In one embodiment, the vehicle load condition is a weight of the vehicle exceeding a predetermined weight threshold. In another embodiment, the vehicle load condition is when the vehicle is towing another object.

According to another embodiment, a method of controlling a hybrid-electric vehicle is provided. The method includes inhibiting a traction battery from powering an electric motor in response to a state-of-charge of the battery reaching a minimum state-of-charge threshold. The method also includes altering the minimum state-of-charge threshold in response to a load of the vehicle exceeding a predetermined threshold.

Another method of controlling a hybrid electric vehicle is provided according to another embodiment of the present disclosure. The method includes inhibiting an electric machine from generating electric power based upon a state-of-charge of a traction battery reaching a maximum state-of-charge threshold. Furthermore, in response to a load of the vehicle exceeding a predetermined threshold, the maximum state-of-charge threshold is altered.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
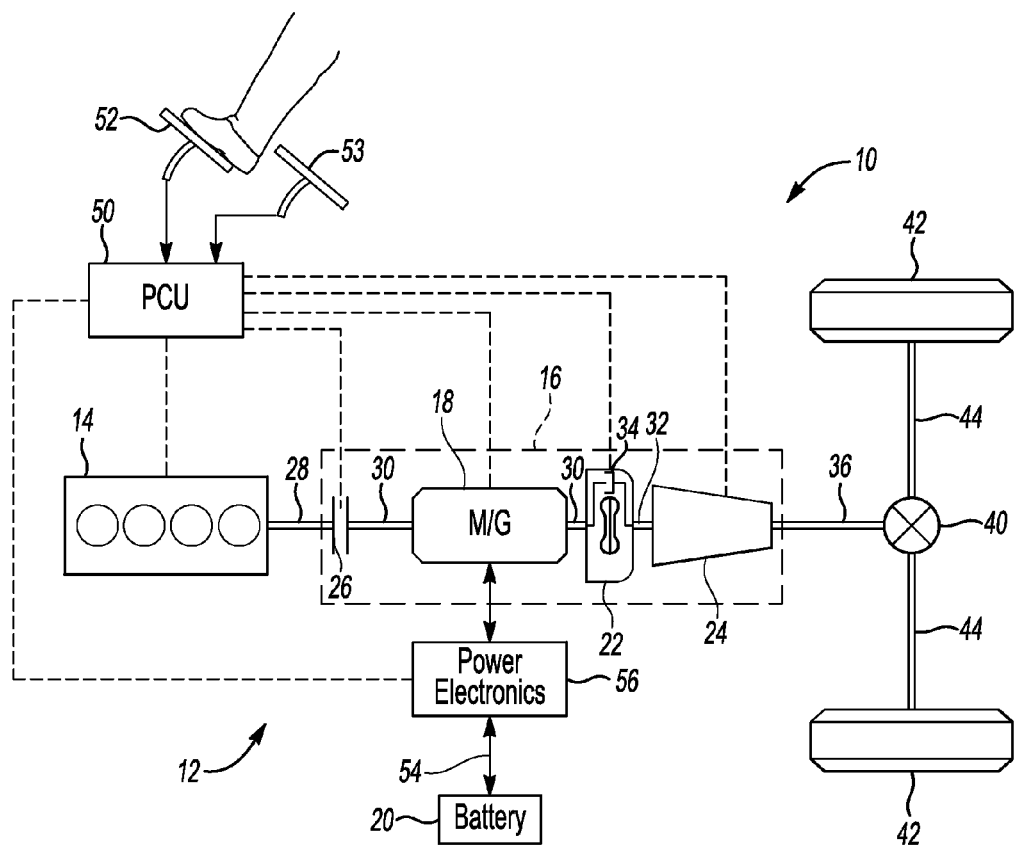
FIG. 1 is a schematic illustration of a powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 and a brake pedal 53 are used by the driver of the vehicle to provide a demanded torque, power, braking, or drive command to propel the vehicle. In general, depressing and releasing the accelerator pedal 52 generates an accelerator pedal position signal that may be interpreted by the controller 50 as a demand for increased power or decreased power, respectively. Based at least upon input from the accelerator pedal, the controller 50 commands torque from the engine 14 and/or the M/G 18. Depression of the brake pedal 53 activates regenerative braking and/or friction braking to decelerate the vehicle.

The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

In typical hybrid vehicles, such as the vehicle 10 shown in FIG. 1, control strategies are provided in the controller 50 to maintain the state-of-charge (SOC) of the battery 20 within a preferred predetermined operating window. For example, it may be desirable to maintain the SOC of the battery 20 during operation within a window of 40% and 60% of full charge. Other such predetermined operating windows are available depending on the needs of each individual vehicle.

If the SOC approaches the lower end of the preferred operating window, then the controller may command the disconnect clutch 26 to engage and the engine 14 to start (if the engine is not already active). Engine power can then be used to both propel the vehicle and charge the battery 20 via the M/G 18 and power electronics 56. The controller can cease commands of electric propulsion by the M/G 18 in order to conserve electric energy in the battery 20.

If the SOC approaches the higher end of the preferred operating window, the controller may command an electric-only operating mode by disconnecting the engine 14 from the M/G 18 (if the engine is not already disconnected). The controller may also use the M/G 18 to add torque to the powertrain while reducing engine torque. Use of the battery 20 to propel the vehicle 10 while reducing or eliminating torque output by the engine 14 will work to drain excess charge from the battery 20 to maintain the SOC within the preferred operating window. The controller may also cease any regenerative braking to inhibit the SOC from increasing past the higher end of the preferred operating window.

During times of excessive vehicle load or when the vehicle is towing another vehicle, it is particularly desirable to make high amounts of torque immediately available for propelling the vehicle. Excessive loads placed upon the vehicle may tend to delay the response of acceleration demands, especially when the vehicle is accelerating from rest. According to various embodiments of the present disclosure, a system is provided to alter the preferred SOC operating window based upon the vehicle load and/or when the vehicle is towing an object. Furthermore, the system can activate the engine based upon the release of a brake pedal when the vehicle is at rest and subject to these excess loads.

Figure 2:
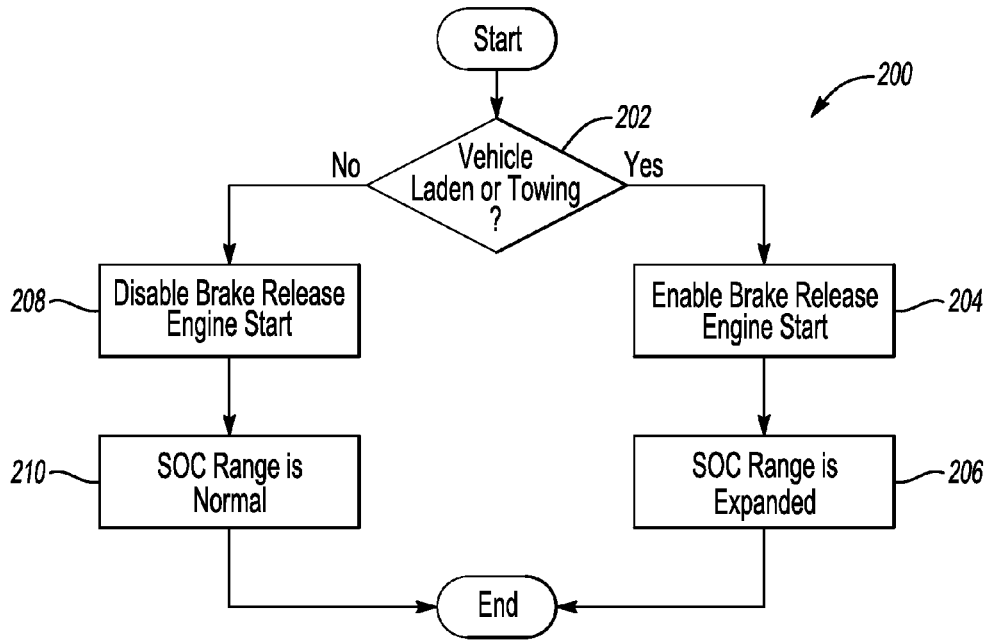
FIG. 2 is a flow chart of an algorithm for controlling the vehicle based on the vehicle being laden or towing.

FIG. 2 illustrates an exemplary flowchart of an algorithm 200 for controlling the operation of the powertrain based upon the excessive loads. At 202, the controller determines whether the vehicle is subject to excessive loads (e.g., laden, towing, inclined, etc.) This can be determined in many various fashions. For example, the excessive load can be indicated by a force acting upon the axles of the vehicle over a threshold force to indicate the weight of the vehicle and its contents. If this weight is above a threshold, this indicates the vehicle is subject to the "excessive loads." Other areas of the vehicle can also be monitored to indicate the weight of the vehicle.

As another example, the excessive load can be indicated by the vehicle towing an object, such as another vehicle, a trailer, etc. A controller in the vehicle can determine that the vehicle is towing another object in many fashions, such as receiving a signal from a tension sensor at a tow hitch on the vehicle, receiving a signal indicating an operator's command that the vehicle operate in a "tow mode (additional discussion provided in FIG. 5 below), detecting an object immediately behind the vehicle by utilizing rearward-facing cameras at the back of the vehicle, receiving a signal from an electronic sensor indicating a connection between tail lights of the vehicle and the towed vehicle. Other systems exist and are contemplated as indicating that the vehicle is towing. In each of these situations in which the vehicle is towing another object, or in which the vehicle is subject to a heavy weight, the vehicle can be said to be subject to "excessive loads" as the term is used in the present disclosure.

If it is indeed determined that the vehicle is subject to excessive loads at 202, the controller can enable an engine-start based upon the release of the brake pedal 53 at 204. For example, the controller may determine that the vehicle is stopped and the brake pedal is depressed to maintain the vehicle at zero velocity. While the vehicle is stopped, the controller continuously monitors the position of the brake pedal. If the operator of the vehicle releases the brake pedal, it can be inferred that an accelerator pedal depression (and thus a desire to accelerate the vehicle) is imminent. Therefore, based upon the tip-out or release of the brake pedal, the controller engages the disconnect clutch 26 and starts the engine 14 (if not already on). The starting of the engine increases the amount of immediately-available torque in the powertrain. This enables the vehicle that is subjected to the excessive loads to adequately accelerate and fulfill driver demand more so than if the vehicle were to accelerate from rest while in an electric-only operating mode.

If it is determined that the vehicle is subject to excessive loads at 202, the controller can also expand the preferred operating window of the battery 20 at 206. Both the lower end (e.g., 40% of total charge) and the higher end (e.g., 60% of total charge) are altered such that a wider preferred operating window is provided. When the lower end of the operating window is decreased (e.g., to 30% of total charge), the battery 20 will be enabled to be commanded by the controller to provide electric assist during acceleration at greater amounts or longer times so as to provide for a better electric "boost" while the vehicle is subject to the excessive loads. When the upper end of the operating window is increased (e.g., to 70% of total charge), the M/G 18 will be enabled to be commanded by the controller to generate additional power (via regenerative braking, for example) and store additional power in the battery 20. This accounts for the longer braking distances and/or the increased amount of braking torque necessary to slow the vehicle when the vehicle is subjected to the excessive loads.

If, however, it is determined at 202 that the vehicle is not subject to the excessive loads, the vehicle operates normally. At 208, the controller may not specifically enable an engine start based on the release of the brake pedal. The controller also may not specifically alter the SOC preferred operating window at 210. In other words, at 208 and 210 the system returns such that the controller continually checks for excessive loads at 202.

Figure 3:
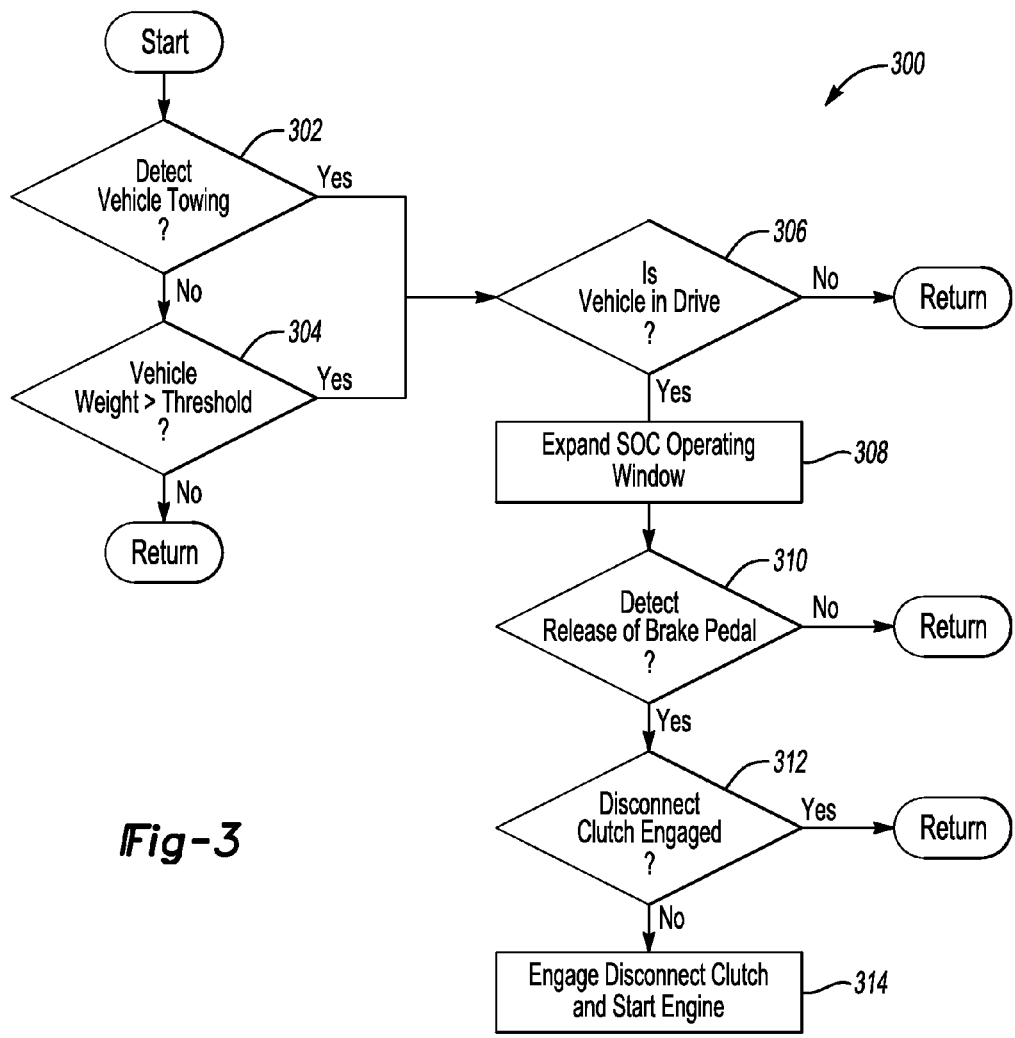
FIG. 3 is a flow chart of an algorithm for controlling the vehicle based on the vehicle being subject to excessive loads.

FIG. 3 illustrates an additional flowchart of an algorithm to control the powertrain during times that the vehicle is subject to excessive loads. At 302, the controller determines whether the vehicle is towing, based upon the exemplary methods described above. If the vehicle is not towing, the controller determines at 304 whether the weight of the vehicle is above a threshold, indicating the vehicle is subject to an excessive load. If neither of these determinations produce a YES, the method returns and continuously checks for either a towing or an excessive load at 302 and 304.

If the vehicle is either towing or subjected to a weight exceeding a predetermined threshold, the vehicle is determined to be subject to excessive load and the method proceeds to 306. At 306, the controller determines what shift gear (e.g., Park, Reverse, Neural, Drive) the vehicle is in. A determination that the vehicle is in Drive indicates that the driver is traveling and intends to begin (or continue) moving forward. Therefore, a future acceleration event may be inferred from the vehicle being in Drive.

If the controller determines the vehicle is in Drive, then at 308, the controller commands the preferred operating window of the SOC of the battery to expand. For example, the controller will alter the preferred operating window from a range of 35%-80% to a range of 25%-85%. As previously discussed, this enables the battery to provide for longer or more powerful electric assist when commanded to do so, as well as utilize regenerative braking during a braking event for a longer distance. The widened SOC preferred operating window therefore provides advantages to the vehicle when additional acceleration and braking demands are needed due to the excessive loads.

With the SOC preferred operating window expanded, the controller also continuously monitors the status of the brake pedal. If the vehicle comes to a rest or reduces to a speed below a threshold, and the operator subsequently releases the brake pedal as determined at 310, then the method proceeds to 312. At 312, the controller determines the status of the disconnect clutch 26 and/or the status of the engine 14. If the disconnect clutch 26 is disengaged, the vehicle is operating in an electric-only mode of operation. In order to increase the amount of immediately available torque from the engine, the controller engages the disconnect clutch 26 and commands ignition in the engine 14 at 314. With the engine engaged at the time the brake pedal is released, the engine is available to provide torque immediately in response to a depression of the accelerator pedal 52. This enables the vehicle to more properly meet driver demand when the vehicle is subjected to the excessive loads.

Figure 4:
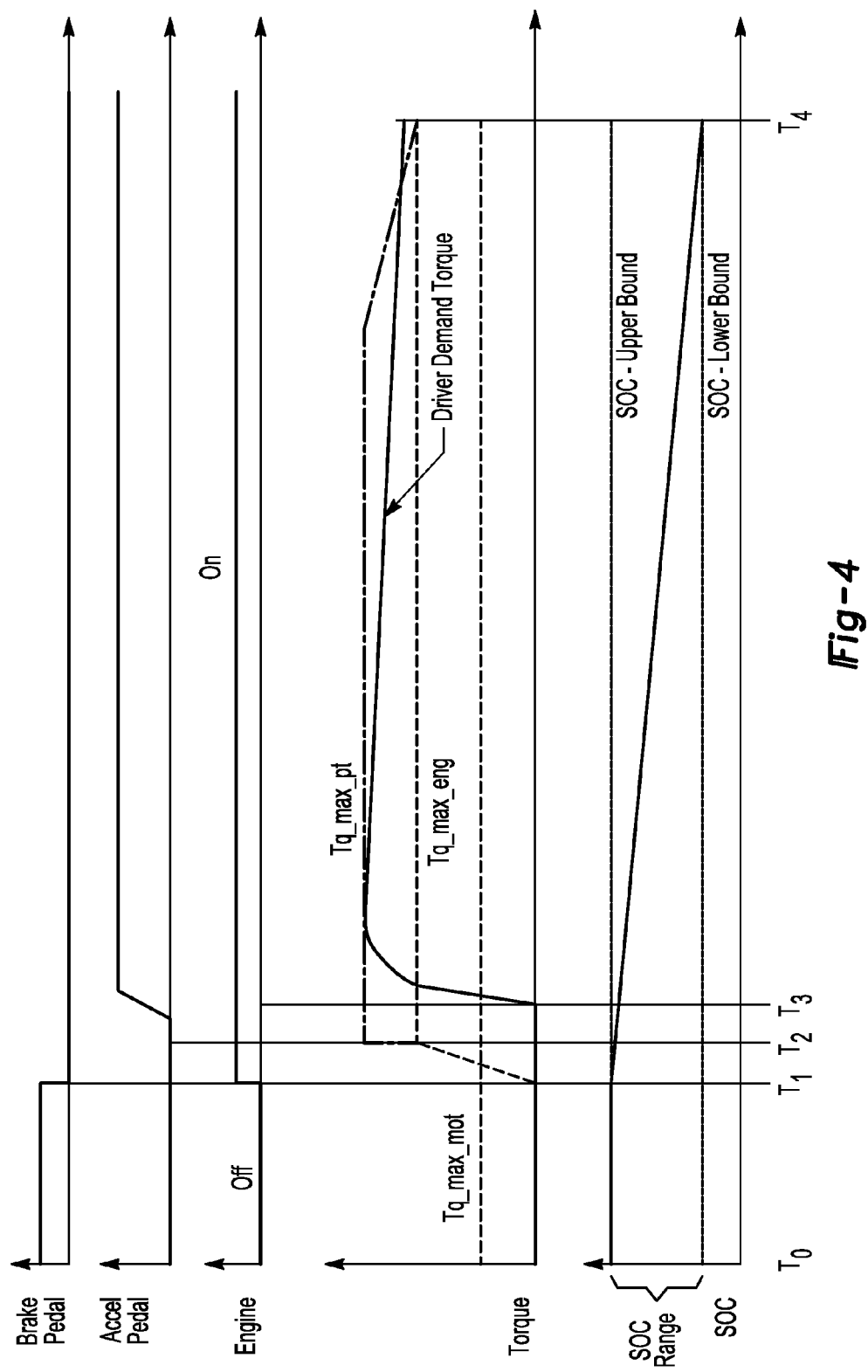
FIG. 4 is a graph of an SOC operating range of a batter and a torque distribution in a powertrain over time while the vehicle is subject to excessive loads.

FIG. 4 illustrates an example of certain characteristics of a vehicle that employs the control system of the present disclosure. In this example, the vehicle begins at rest while being subjected to the excessive loads, and the operator of the vehicle provides a heavy tip-in of the accelerator pedal, indicating the need for a high amount of immediate torque to quickly accelerate the vehicle.

At time $T_0$, the vehicle is at rest. The battery has been charged such that the SOC is at the upper bound of its expanded preferred operating window. In other words, the controller in the vehicle has determined that the vehicle is subject to the excessive load, and has therefore expanded the SOC operating window so that the battery is fully charged at the maximum of the expanded SOC window.

At time $T_1$, the operator of the vehicle has released the brake pedal in anticipation of accelerating the vehicle. Based on the release of the brake pedal, the controller also commands the engine to turn on by engaging the disconnect clutch 26 and commanding ignition in the engine 14. Due to the starting of the engine, the max torque (Tq_max_eng) rises to its maximum point from $T_1$ to $T_2$.

At time $T_2$, the engine has fully started and is running. The acceleration demand remains zero. Due to the additional available torque provided by the fully-started engine, the maximum torque at the powertrain (Tq_max_pt) is equal to the sum of the maximum torque of the engine (Tq_max_eng) and the maximum torque of the M/G (Tq_max_mot).

At time $T_3$, the operator of the vehicle depresses the accelerator pedal. With the full powertrain torque (Tq_max_pt) already at its maximum, the driver's demand is met. The vehicle can therefore properly provide the torque and acceleration according to the driver demand dictated by the depression of the accelerator pedal. From $T_3$ to $T_4$, the driver demand exceeds the maximum torque in the engine (Tq_max_eng). The M/G therefore supplements the torque of the engine to meet the driver demand. The SOC of the battery depletes during the use of the M/G. However, since the SOC range has been expanded, use of the M/G takes longer to deplete the battery to the lower bounds of its operating window. This provides a better opportunity for the M/G to remain an active torque provider for a longer time and therefore better meet driver demand during the entire acceleration event.

At time T4, the SOC has depleted to its lower boundary of the SOC operating window. Available battery current is therefore zero. Because of this, the powertrain torque (Tq_max_pt) reduces to a level equal with that of the engine alone (Tq_max_eng), and the engine remains the sole torque provider during the remainder of the acceleration event.

Figure 5:
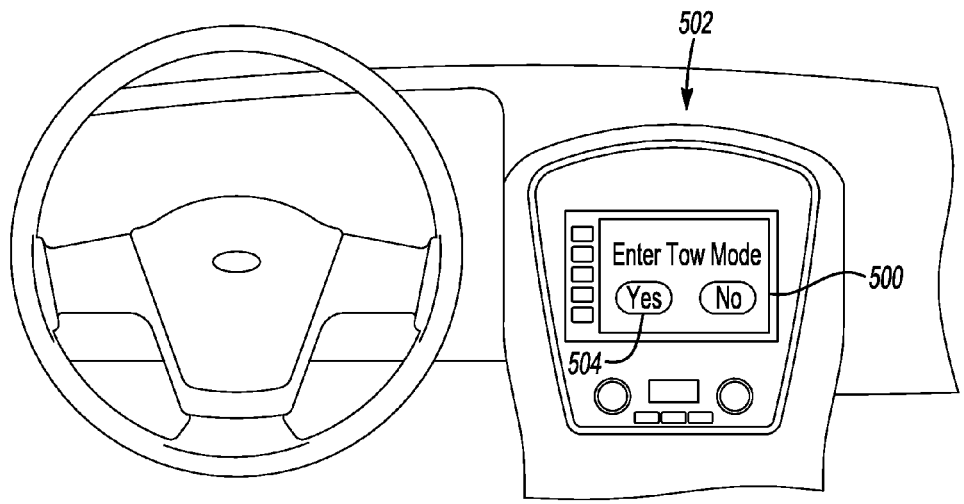
FIG. 5 is an example of an interactive information display within a dashboard of the vehicle for commanding the vehicle to operate in a tow mode.

As previously discussed, there are multiple ways in which the controller in the vehicle can determine if the vehicle is towing another object. FIG. 5 illustrates one such example, in which an interactive information display 500 is disposed within a dashboard 502 of the vehicle, such as in an instrument panel or a center console area. The information display 500 may be part of another display system, such as a navigation display system, or may be part of a dedicated information display system. The information display 500 may be a liquid crystal display (LCD), a plasma display, an organic light emitting display (OLED), or any other suitable display. The information display 500 may include a touch screen for receiving driver input associated with selected areas of the screen of the information display 500. One or more buttons 504 may be included on the information display 500.

The operator of the vehicle may navigate to a screen in which a tow mode selection is available. At this screen, the operator can manually direct the controller of the vehicle to enter a "tow mode" such that the vehicle automatically operates as if it is subject to the excessive loads. If the operator utilizes the information display 500 to enter the "tow mode," the controller will respond with a YES for steps 302 and/or 304 of the previously described method such that the SOC operating window can be widened and the engine can be enabled to engage upon the release of the brake pedal.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   an electric machine;
   a battery connected to the electric machine; and
   a controller programmed to inhibit the electric machine from propelling the vehicle in response to a charge of the battery reaching a minimum state-of-charge threshold, inhibit regenerative braking in response to the charge reaching a maximum state-of-charge threshold, and decrease the minimum state-of-charge threshold and increase the maximum state-of-charge threshold in response to detecting a vehicle load condition.

2. The vehicle of claim 1, wherein the controller is further programmed to decrease the minimum state-of-charge threshold in response to detecting the vehicle load condition to increase an amount of available electric power.

3. The vehicle of claim 1, wherein the controller is further programmed to increase the maximum state-of-charge threshold in response to detecting the vehicle load condition to enable an increased amount of electric energy generation.

4. The vehicle of claim 1, wherein the vehicle load condition is defined by a weight of the vehicle exceeding a predefined value.

5. The vehicle of claim 1, wherein the vehicle load condition is defined by a state in which an object is being towed.

6. The vehicle of claim 1, further comprising a brake pedal and a clutch configured to selectively couple the engine to the electric machine, wherein the controller is further programmed to start the engine in response to (i) a release of the brake pedal while the vehicle is stopped and in drive and (ii) detecting the vehicle load condition to increase available engine torque prior to vehicle launch.

7. The method of claim 1, wherein the decreasing of the minimum state-of-charge threshold and the increasing the maximum state-of-charge threshold widens an operating window of the battery.

8. A method of controlling a vehicle comprising:
inhibiting a battery from powering an electric motor in response to a state-of-charge of the battery reaching a minimum state-of-charge threshold;
inhibiting regenerative braking in response to the state-of-charge reaching a maximum state-of-charge threshold; and
in response to a load of the vehicle exceeding a predetermined threshold, decreasing the minimum state-of-charge threshold and increasing the maximum state-of-charge threshold.

9. The method of claim 8, wherein the altering includes decreasing the minimum state-of-charge threshold to increase an amount of available electric power.

10. The method of claim 8, further comprising receiving a signal indicating that an object is being towed by the vehicle, wherein the step of altering occurs in response to the signal.

11. The method of claim 8, wherein the load of the vehicle is defined by a weight of the vehicle.

12. The method of claim 8, further comprising starting an engine in response to (i) a release of a brake pedal while the vehicle is stopped and in drive, and (ii) the load of the vehicle exceeding the predetermined threshold.

13. A method of controlling a hybrid vehicle comprising:
inhibiting a battery from powering an electric motor in response to a state-of-charge of the battery reaching a minimum state-of-charge threshold;
inhibiting the motor from generating electric power based upon a state-of-charge of a traction battery reaching a maximum state-of-charge threshold; and
in response to a load of the vehicle exceeding a predetermined threshold, increasing a difference between the maximum and minimum state-of-charge thresholds.

14. The method of claim 13, wherein the altering includes increasing the maximum state-of-charge threshold to enable an increased amount of electric energy generation.

15. The method of claim 13, further comprising receiving a signal indicating that of an object is being towed by the vehicle, wherein the step of altering is further in response to the signal.

16. The method of claim 13, wherein the load of the vehicle is defined by a weight of the vehicle.

17. The method of claim 13, further comprising starting an engine in response to (i) a release of a brake pedal while the vehicle is stopped and in drive, and (ii) the load of the vehicle exceeding the predetermined threshold.

18. The method of claim 8, wherein the decreasing of the minimum state-of-charge threshold and the increasing the maximum state-of-charge threshold widens an operating window of the battery.

* * * * *